Feb. 21, 1950 R. E. PETERSON ET AL 2,498,295
REDUCTION GEAR DRIVE
Filed Sept. 19, 1947
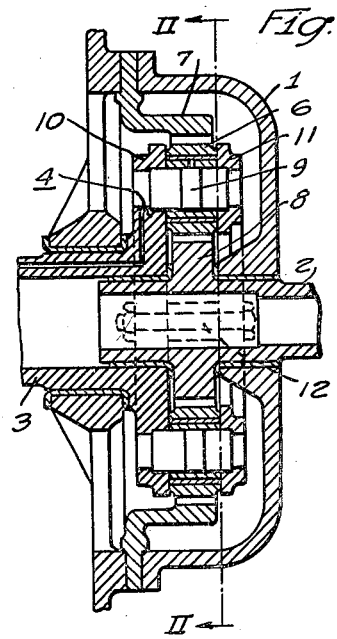
Fig. 1.
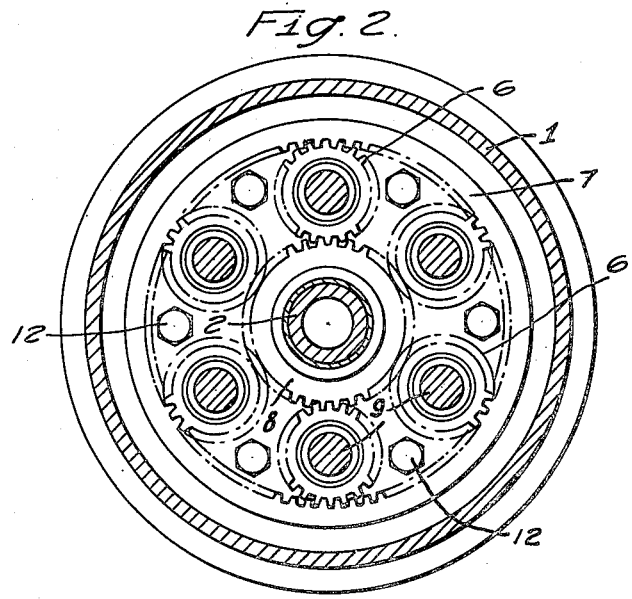
Fig. 2.
Fig. 4.
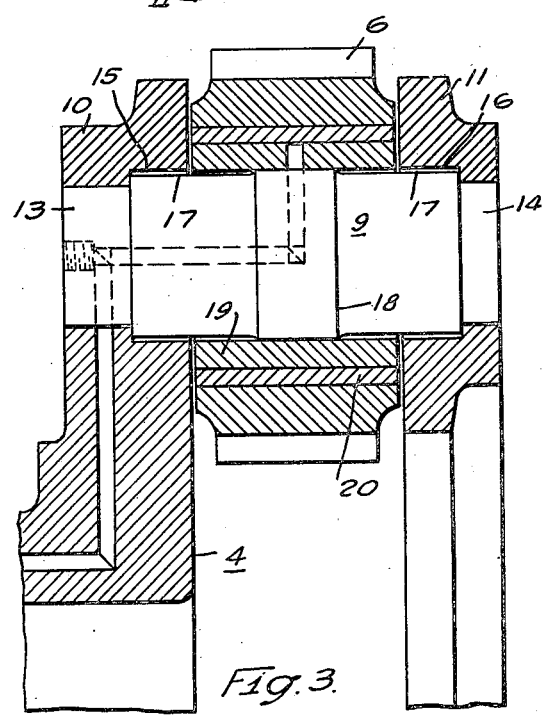
Fig. 3.
WITNESSES:
E. A. McCloskey
Frw. C. Groome
INVENTORS
Rudolph E. Peterson
and John Boyd.
BY
Paul C. Friedemann
ATTORNEY Patented Feb. 21, 1950

2,498,295

UNITED STATES PATENT OFFICE 2,498,295

REDUCTION GEAR DRIVE

Rudolph E. Peterson and John Boyd, Pittsburgh, Pa., assignors to Westinghouse Electric Corporation, East Pittsburgh, Pa., a corporation of Pennsylvania Application September 19, 1947, Serial No. 774,932

3 Claims. (Cl. 74—801)

This invention relates to gearing and more particularly to an improved construction of planetary transmission.

Recent developments in power plants for aircraft have been toward increased horsepower and higher speeds of operation. With engines, such as gas turbine engines, developing several thousand horsepower at speeds in the nature of 10,000 R. P. M., difficulty has been encountered in producing the speed reduction transmissions necessary to transmit power to the propeller which will stand up under the intense bearing and gear teeth pressures developed. One form of speed reduction transmission for transmitting power to the airplane propeller is the planetary type transmission in which there is employed a plurality of planet pinions in meshing engagement with a sun gear. One of the problems encountered in planetary transmissions is the difficulty in accurately positioning the planet pinions about the periphery of the sun gear. In the event that the planet pinions are not positioned properly, one of the planet pinions may tend to transmit all or a substantially large portion of the power being transmitted. Such a condition will result in excessive gear teeth and bearing pressures on the pinion which is not positioned properly and thereby cause failure of the transmission in a comparatively short period of time.

One of the objects of this invention is to provide an improved construction of planetary transmission gearing which will be operative to effect more uniform distribution of the load being transmitted between the plural planet pinions.

A further object of the invention is to provide an improved mounting for planet pinions which will be effective to transfer part of the load from one of the pinions to the remaining pinions in the event that the load on one of the pinions is excessive.

A further object of the invention is to provide an improved elastic mounting for gears which is adaptable for use in planetary transmissions.

Other objects and advantages of the invention will become apparent during the course of the following description and the accompanying drawings, in which:

Figure 1 is a sectional view of a planetary transmission constructed in accordance with the principles of this invention;

Fig. 2 is a sectional view taken substantially along the line II—II of Fig. 1;

Fig. 3 is an enlarged view of a portion of the transmission shown in Fig. 1 illustrating a preferred form of resilient mounting for the planet pinions; and Fig. 4 is a broken-away view showing a modified construction for providing a resilient pinion mounting.

Referring to the drawings, there is shown a housing 1 containing a planetary transmission for providing a speed reduction connection between a drive shaft 2 and a driven shaft 3. The driven shaft 3 is connected to a planet cage 4 carrying a plurality of planet pinions 6 in meshing engagement with an internal ring gear 7 secured to the casing 1, and with a sun gear 8 connected to the driving shaft 2. The planet pinions 6 are mounted on pins 9 which have their ends mounted in spaced annular plates 10 and 11 rigidly connected together as by bolts 12 cooperating together to form a planet cage in accordance with conventional practice.

The manner in which the planet pinions are distributed circumferentially about the sun gear 8 and ring gear 7 is best illustrated in Fig. 2. In order that each of the several planet pinions will be loaded equally and thereby have identical bearing and gear tooth pressures, it is necessary that the relative angular positions of the several pinions be lined up with extreme care in building the transmission. In the event that one of the pinions is out of alignment as much as a few thousandths of an inch, such pinion may tend to transmit all or a substantially large part of the load, and the other pinions will be unloaded a corresponding amount. The pinion transmitting a disproportionately large share of the load will then be subjected to excessive pressures on its gear teeth and bearing surfaces. Since the gear teeth and bearings are operated at high pressures under normal conditions in high speed transmission gearing, it will readily be seen that the excessive pressures encountered by reason of improper positioning of the pinions will result in breakdown of the transmission in a comparatively short period of time.

In Fig. 3 there is shown a preferred construction for preventing excessive loading of the pinions due to improper positioning of the pinions. In this showing, it will be noted that the ends 13 and 14 of the pins 9 are of a reduced diameter and are provided with a press fit in the supporting members 10 and 11 which constitute part of the planetary cage 4. Inwardly of the openings receiving the reduced diameter portions 13 and 14, the members 10 and 11 are provided with enlarged openings 15 and 16 for the reception of the main body portion of the pin 9. The openings 15 and 16 are of a larger diameter than the main body portion of the pin 9 to provide a space 17 for a purpose to be described. Centrally of the pin 9 there is provided an enlarged portion 18 on which is mounted a journal 19 which supports the bearing 20 mounted on the inner surface of the pinion 6.

The space 17 is of vital importance from the standpoint of operation of the construction shown in Fig. 3, since such space permits flexing movement of the pin 9 to compensate for excessive loading due to misalignment of the pinion 6. The load transmitted by the pinion 6 is carried entirely by the enlarged central portion 18 which is spaced from the pins supporting members 13 and 14. There is thus provided a simple beam construction having restrained end supports due to the press fitting of the ends 13 and 14 of pins 9 into members 10 and 11, respectively, which is flexible due to the inherent elastic properties of the material from which the pin 9 is formed. By reason of this construction, if one of the pinions 6 is a few thousandths of an inch out of alignment or an amount sufficient to cause such pinions to assume a disproportionately large share of the load being transmitted, then the pin carrying such pinion will be deflected by reason of such loading an amount sufficient to permit other pinions to assume their proportionate share of the load. The elastic beam mounting provided by the particular shape of the pin 9 and its mounting as shown in Fig. 3 thus assures a substantially equal division of the load among the several pinions of a plural pinion planetary transmission.

In the modification shown in Fig. 4, there is shown a construction for providing a modified elastic beam support for the planet pinion 6. This showing shows the manner in which the end of the pin 9 is mounted in the support 11. In this construction, the opening in which the end of the pin 9 is receivable is extended tangentially from diametrically opposite points lying in a plane extending radially of the transmission to provide the openings 21 and 22. The distance between the surfaces 31 and 32 defining the openings 21 and 22 is slightly larger than the diameter of the pin 9 so that the pin 9 may move to the right as viewed in Fig. 4 without interference for a purpose to be described. Between the openings 21 and 22, the material of the supporting member 11 engages with the pin 9 as at 23. To complete the construction, slots 24 and 25 connected by a slot 26 are formed through the body of the plate 11. The mounting of the other end of the pin 9 in the other supporting member 10 will be identical to that shown in Fig. 4 and accordingly has not been illustrated. The construction shown in Fig. 4 provides an elastic beam 27 of substantially E-shaped configuration again having restrained end conditions which engages with the pin 9 along the arcuate portion 23 at the extremity of the center arm of the E-shaped beam. When excessive loads are encountered, the beam 27 will flex in a direction to the right, as viewed in Fig. 4 and thus permit a transfer of the load to the other pinions in the same manner as does the resilient construction shown in Fig. 3. The location of the E-shaped beam 27 shown in Fig. 4 is determined by the direction in which the force is applied to the support pin, and in a planetary transmission, such direction will be in a direction tangential to the path of movement of the supporting pins 9.

From the foregoing, it will be apparent that there is provided an improved mounting for plural planet pinions which is effective to divide the load being transmitted more uniformly among the several pinions. This action is had notwithstanding the fact that the pinion axes may be imperfectly spaced an amount sufficient to cause excessive loading in transmissions constructed in accordance with conventional practice. The elastic beam type mountings provided for the pinions 6, as shown in Figs. 3 and 4, thus removes the effects of slight imperfect spacing of the pins 9 and effectively prevents excessive gear tooth pressures and bearing pressures which would otherwise result in failure of the transmission.

Attention is particularly invited to the fact that the flexing movement of the pinions is due to the inherent elastic properties of the pinion support. In the one case, as shown in Fig. 3, the flexibility is due to the elastic properties of the pin between the end portions 13 and 14 by which the pin is mounted in the planet cage. In the other case, as shown in Fig. 4, the flexibility is due to the elastic properties of the support for the pin as provided by the elastic E-shaped beam 27 formed in the ring members 10 and 11. In both cases, there is provided an elastic support by which the position of a pinion axis may shift angularly relative to the planetary cage in response to excessive overloads on a given pinion caused initially by improper positioning of such pinion in the construction of the transmission. The elastic beam support provided for each of the pinions thus enables the pinions of a transmission having pinion axes originally improperly positioned to adjust themselves in operation to thereby effect a substantially uniform distribution of the load among the several pinions. It will thus be seen that the elastic pinion support of this invention enables the construction of a transmission without the extreme accuracy heretofore necessary in addition to eliminating the faults encountered due to improper positioning as explained above. The invention thus results in improved performance and at the same time decreased cost of construction.

The importance of the elastic beam type of support provided for each individual pinion cannot be overemphasized. It will be noted that by reason of the elastic beam support the flexing compensation or positional adjustment of the pinion axes to compensate for inaccuracies in construction, which would otherwise result in excessive loads on a given pinion, is accomplished without the use of relatively movable parts having surfaces in frictional or sliding engagement to permit relative movement therebetween. There are thus no parts subject to wear or which would require lubrication. Accordingly, it will be understood that where the expression "elastic beam support" is used herein and in the claims, there is meant a support for the pinions in which there are no relatively moving parts with incident frictionally engageable and sliding surfaces subject to wear and in which the desired flexing movements are accomplished by the inherent elastic nature of the material forming the beam support for the pinion. It will thus be understood that the term "elastic beam support" is specifically and intentionally limited and as limited is meant to exclude any construction in which resilient elements are specifically inserted in a gear mounting where such resilient elements result in relatively movable parts having surfaces in sliding frictional engagment and thus subject to wear.

Since numerous changes may be made in the above-described construction and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. In a planetary transmission, a pair of rotatable members, and planetary gearing for transmitting motion between said members comprising a sun gear and a planet cage carrying a plurality of planet pinions in meshing engagement with said gear, and an independent elastic beam support mounting each of said pinions on said cage, each elastic beam support comprising a pinion supporting pin having its ends mounted in said planet cage, said cage having cut-out portions forming a beam of generally E-shaped configuration in which the extremities of the outer arms of the E-shaped beam originate at points on diametrically opposite sides of said pin, the space therebetween being of a dimension greater than the diameter of said pin to afford clearance for said pin, and the extremity of the central arm of said E-shaped beam is of arcuate configuration and disposed in abutting relation with said pin, said assembly providing an elastic beam for said supporting members which deflects an amount corresponding to the load carried by the pinions on said supporting members, the elastic mounting provided by said cut-out portions being effective to secure a substantially equal division of the total load amongst said several pinions.

2. A gear mount comprising, in combination, a support, a gear to be mounted on said support, a bearing for said gear, and an elastic support mounting said bearing on said support comprising a supporting pin having its ends mounted in said support, said support having cut-out portions adjacent the ends of said pins defining a beam the ends of which are integral with said support and having a centrally disposed seat for receiving said pin, said beam providing a flexible support which will deflect in response to a load on said gear.

3. A resilient supporting structure for a gear comprising, in combination, a gear, a pin for mounting said gear, a pair of supports respectively disposed adjacent the ends of said pin and having the ends of said pin mounted therein, said supports each having cutout portions forming a beam of generally E-shaped configuration in which the extremities of the outer arms of the E-shaped beam originate at points on diametrically opposite sides of said pin, the space therebetween being of a dimension greater than said pin to afford clearance for said pin, and the extremity of the central arm of said E-shaped beam, is of arcuate configuration and disposed in abutting relation with said pin.

RUDOLPH E. PETERSON.
JOHN BOYD.

REFERENCES CITED

The following references are of record in the file of this patent:

UNITED STATES PATENTS

| Number | Name | Date |
|---|---|---|
| 1,127,312 | Sundh | Feb. 2, 1915 |
| 1,425,430 | Wikander | Aug. 8, 1922 |
| 2,127,463 | Chilton | Aug. 16, 1938 |
| 2,144,937 | Ryder | Jan. 24, 1939 |
| 2,307,129 | Hines et al. | Jan. 5, 1943 |

FOREIGN PATENTS

| Number | Country | Date |
|---|---|---|
| 682,354 | Germany | Sept. 28, 1939 |